United States Patent
Flynn

(10) Patent No.: US 10,005,029 B2
(45) Date of Patent: Jun. 26, 2018

(54) METHOD AND SYSTEM FOR SEQUESTERING CONSTITUENTS AND CREATING BY PRODUCTS FROM A GAS FEED

(71) Applicant: Jeremiah Flynn, Owings Mills, MD (US)

(72) Inventor: Jeremiah Flynn, Owings Mills, MD (US)

(*) Notice: Subject to any disclaimer, the term of this patent is extended or adjusted under 35 U.S.C. 154(b) by 0 days. days.

(21) Appl. No.: 15/107,071

(22) PCT Filed: Aug. 10, 2015

(86) PCT No.: PCT/US2015/044477
§ 371 (c)(1),
(2) Date: Jun. 21, 2016

(87) PCT Pub. No.: WO2016/025391
PCT Pub. Date: Feb. 18, 2016

(65) Prior Publication Data
US 2016/0332116 A1    Nov. 17, 2016

Related U.S. Application Data

(60) Provisional application No. 62/035,450, filed on Aug. 10, 2014.

(51) Int. Cl.
*B01D 53/78* (2006.01)
*B01D 53/34* (2006.01)
(Continued)

(52) U.S. Cl.
CPC .......... *B01D 53/78* (2013.01); *B01D 53/343* (2013.01); *B01D 53/60* (2013.01); *B01D 53/62* (2013.01);
(Continued)

(58) Field of Classification Search
None
See application file for complete search history.

(56) References Cited

U.S. PATENT DOCUMENTS 4,487,784 A * 12/1984 Kuroda ................ B01D 53/501
106/752
4,491,093 A *  1/1985 Hoekstra ................ F22B 3/045
110/215
(Continued)

FOREIGN PATENT DOCUMENTS

CA      2832248 A1    6/2014
EP      1089939 B1    3/2009
(Continued)

OTHER PUBLICATIONS

International Search Report and Written Opinion dated Nov. 9, 2015 in corresponding International Patent Application No. PCT/US2015/044477.

(Continued)

*Primary Examiner* — Sheng H Davis

(57) ABSTRACT

Systems and methods for sequestering gas feed constituents and creating gas feed byproducts are disclosed. The systems and methods contemplate use of and processing of fluids using fluid energy transfer modules, scrubber unit(s), a slurry reaction vessel, a surge tank treatment vessel purifier(s) and a concentrator. Chemical solutions, solids etc. are regenerated and reused thereby increasing system and/or process efficiency and savings while also producing products for commercialization.

12 Claims, 7 Drawing Sheets

(51) Int. Cl.
  *B01D 53/60* (2006.01)
  *B01D 53/62* (2006.01)
  *B01D 53/96* (2006.01)
  *B01D 53/26* (2006.01)
(52) U.S. Cl.
  CPC ............ *B01D 53/96* (2013.01); *B01D 53/265* (2013.01); *B01D 2251/302* (2013.01); *B01D 2251/304* (2013.01); *B01D 2251/402* (2013.01); *B01D 2251/404* (2013.01); *B01D 2251/604* (2013.01); *B01D 2257/302* (2013.01); *B01D 2257/404* (2013.01); *B01D 2257/504* (2013.01); *B01D 2258/0283* (2013.01); *Y02C 10/04* (2013.01)

(56) References Cited

U.S. PATENT DOCUMENTS

| | | | |
|---|---|---|---|
| 5,480,619 A * | 1/1996 | Johnson | B01D 53/002 422/168 |
| 6,402,816 B1 | 6/2002 | Trivett et al. | |
| 6,755,892 B2 | 6/2004 | Nalette et al. | |
| 7,247,284 B1 * | 7/2007 | Seck | C01D 1/20 23/304 |
| 7,381,378 B2 | 6/2008 | McWhorter | |
| 7,846,406 B2 | 12/2010 | Furnary et al. | |
| 7,910,079 B2 | 3/2011 | Anttila et al. | |
| 2006/0223892 A1 | 10/2006 | Pawlak et al. | |
| 2007/0012187 A1 * | 1/2007 | Deen | B01D 53/263 95/242 |
| 2009/0081096 A1 | 3/2009 | Pellegrin | |
| 2009/0104098 A1 | 4/2009 | Singh | |
| 2014/0134710 A1 | 5/2014 | Grill | |

FOREIGN PATENT DOCUMENTS

| | | |
|---|---|---|
| GB | 2428011 B | 2/2010 |
| JP | 2012106215 A | 6/2012 |
| KR | 1020110084811 A | 7/2011 |
| WO | 2015154174 A1 | 10/2015 |

OTHER PUBLICATIONS

International Preliminary Report on Patentability dated Feb. 14, 2017 in corresponding International Patent Application No. PCT/US2015/044477.

Chen, et al., "Scrubbing of CO2 Greenhouse Gases, Accompanied by Precipitation in a Continuous Bubble-Column Scrubber", American Chemical Society, Ind. Eng. Chem. Res., 2008, 47(16): 6336-6343.

* cited by examiner

METHOD AND SYSTEM FOR SEQUESTERING CONSTITUENTS AND CREATING BY PRODUCTS FROM A GAS FEED

CROSS-REFERENCE TO RELATED APPLICATIONS

This Application is a national stage entry of PCT Patent Application No. PCT/US2015/044477, filed Aug. 10, 2015 and published as WO 2016/025391, which claims priority and the benefit of U.S. Provisional Patent Application No. 62/035,450 titled "Methods for Sequestering Constituents And Creating By-Products From Flue Gas" filed Aug. 10, 2014, each of which is incorporated herein in its entirety.

FIELD OF THE INVENTION

The present invention relates, in general, to the removal of contaminants in a gas flue and more particularly to the sequestering and/or removal of gas flue constituents of a gas stream through, inter alia, absorption and the creation of by products from the same for commercialization and/or disposal.

BACKGROUND OF THE INVENTION

Scrubber systems on the market today are primarily focused on sulfur dioxide removal. A new generation of scrubbers which have emerged to remove carbon dioxide do not address the magnitude of carbon dioxide being emitted from industrial sites. Sulfur oxides generally comprise about 2% to 4% of flue gas emissions from a typical coal fired power plant while carbon is closer to 20%.

The designs currently available use a disproportionally large amount of energy in the carbon capturing process. That is to say, they are in some cases, carbon neutral and do not address the problem of capturing more carbon than they use. In addition, the problem of disposal and raw material cost has been poorly managed.

Current processes suggest compression of carbon dioxide into cylinders or tankers with the ultimate goal of injecting the carbon dioxide into the earth's crust. Other processes suggest capturing the carbon as a carbonate and disposing of it in landfills or water streams. Furthermore, other carbon capture systems use biological molecules which require a very narrow range of pHs and temperatures to function properly. This constraint requires said processes to waste the energy in flue gas and constantly monitor pH in the biological part of the process. Eventually the biological molecules need to be replaced to maintain efficacy of the system. Some disadvantages of these current systems/processes include:
  a) High energy costs, which are proportional to carbon dioxide emissions.
  b) Additional costs in the disposal of waste or sequestering of carbon dioxide in pressurized vessels.
  c) Cost of replacing spent scrubbing liquor.
  d) Poor scaling across multiple industries, including the power, concrete, and automotive industry.

In light of the foregoing problems and disadvantages of existing processes, there exists a need for much more efficient method(s) and system(s) for sequestering constituents and byproducts from flue gas. In an aspect of an embodiment of method(s), system(s) of the contemplated invention, the scrubber solution may be sent to a reaction vessel where a slurry is created and used to create byproducts and re-usable constituents for scrubbing. The byproducts are then purified and ready for other uses or commercialization.

Accordingly, several advantages of one or more aspects of embodiments of the presently contemplated invention include reduced energy use, recycling of compounds and streams that make the reduction of energy and materials possible, and an increase in the number of compounds which can be scrubbed and isolated for a more cost effective solution to emissions management across multiple industries and systems.

SUMMARY OF THE INVENTION

Aspects of embodiments of the present invention contemplate method(s) for sequestering gas feed constituents and creating gas feed byproducts which may include the steps of feeding a gas stream through fluid energy transfer module(s), feeding output of the fluid energy transfer module(s) through scrubber unit(s), feeding output from the scrubber unit(s) to a slurry reaction vessel. In one aspect of an embodiment of the present invention the output from the scrubber unit(s) may be mixed with chemicals within the slurry reaction vessel to effect an ion exchange reaction.

An aspect of an embodiment of the present invention may also contemplate feeding the slurry output from the slurry reaction vessel to a surge tank treatment vessel where the slurry output's pH may be adjusted resulting in a treated solution, feeding the treated solution to purifier(s) and feeding output from the purifier(s) to a concentrator.

An aspect of an embodiment of the present invention may include the step of feeding concentrated solution to the scrubber unit(s) where the concentrated solution may be produced as a result of feeding the gas stream through the fluid energy transfer module(s).

An aspect of an embodiment of the present invention may include the step of feeding a hydroxide to the fluid energy transfer module(s), where the hydroxide may be regenerated as a result of the ion exchange reaction at the slurry reaction vessel.

An aspect of an embodiment of the present invention may include the step of directly feeding partially or fully unscrubbed gas stream to any one of: the scrubber unit(s) or the surge tank treatment vessel.

An aspect of an embodiment of the present invention may include the step of directly feeding the output of the fluid energy transfer module(s) to the surge tank treatment vessel.

An aspect of an embodiment of the present invention may include the step of precipitating solids from the purifier(s).

An aspect of an embodiment of the present invention may include the step of concentrating the input feed to the concentrator where the concentration step may be effected by evaporating water from the input feed.

An aspect of an embodiment of the present invention may include the step of removing water from the fluid energy transfer module(s).

An aspect of an embodiment of the present invention may include the step of removing scrubbed flue gas from the scrubber unit(s).

An aspect of an embodiment of the present invention contemplates a method for sequestering gas feed constituents and creating gas feed byproducts which may include the steps of: feeding a gas stream through scrubber(s), feeding output from the scrubber(s) to a slurry reaction vessel where the output from the scrubber(s) is mixed with chemicals within the slurry reaction vessel to effect an ion exchange reaction, feeding slurry output from the slurry reaction vessel to a surge tank treatment vessel where the slurry output's pH is adjusted resulting in a treated solution, and feeding the treated solution to a concentrator.

Another aspect of an embodiment of the present invention contemplates a system for sequestering gas feed constituents and creating gas feed byproducts where the system may include fluid energy transfer module(s), scrubber unit(s) connected to the fluid energy transfer module(s), a slurry reaction vessel connected to the scrubber unit(s), a surge tank treatment vessel connected to the slurry reaction vessel, purifier(s) connected to the surge tank treatment vessel, and a concentrator connected to the purifier(s).

In another aspect of an embodiment of the present invention, the fluid energy transfer module(s) may be a system of the fluid energy transfer module(s) in series.

In another aspect of an embodiment of the present invention, the fluid energy transfer module(s) be a system of the fluid energy transfer module(s) in parallel.

In another aspect of an embodiment of the present invention, the fluid energy transfer module(s) may include a system of the fluid energy transfer module(s) under pressure.

In another aspect of an embodiment of the present invention, the fluid energy transfer module(s) may be a system of the fluid energy transfer module(s) operating with a vacuum.

A further aspect of an embodiment of the present invention contemplates a system for sequestering gas feed constituents and creating gas feed byproducts which may include: scrubber(s); a slurry reaction vessel connected to the scrubber(s), a surge tank treatment vessel connected to the slurry reaction vessel, and a concentrator connected to the surge tank treatment vessel.

In a further aspect of an embodiment of the present invention, the system may also include fluid energy transfer module(s) where the fluid energy transfer module(s) may be connected to an input to the at least one scrubber.

In a further aspect of an embodiment of the present invention, the concentrator may be indirectly connected to the surge tank treatment vessel by way of purifier(s) which, in turn, may be directly connected to the surge tank treatment vessel.

Additional aspects, objectives, features and advantages of the present invention will become apparent from the following description of the preferred embodiments with reference to the attached drawings.

DETAILED DESCRIPTION OF THE INVENTION

Figure 7:
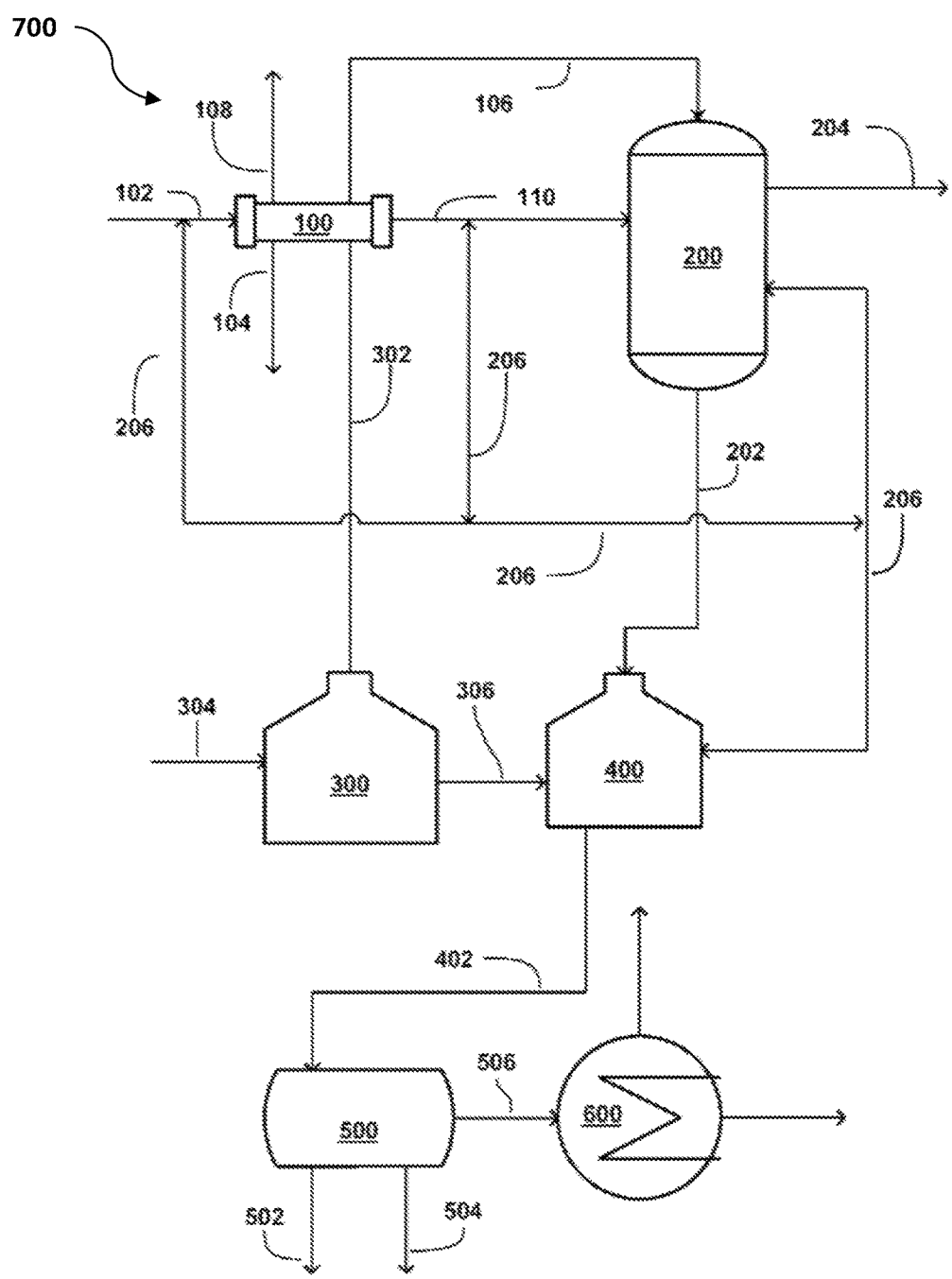
FIG. 7 illustrates an overall view of a system for the capture and processing of carbon, sulfur, and nitrogen oxides from a gas stream for the purpose of disposal, reuse, an/or commercial utilization according to an aspect of an embodiment of the present invention.

Reference is now made to system 700 as illustrated in FIG. 7 and each figure illustrating each unit, component or module of system 700 according to aspect(s) of embodiment(s) of the present invention.

Figure 1:
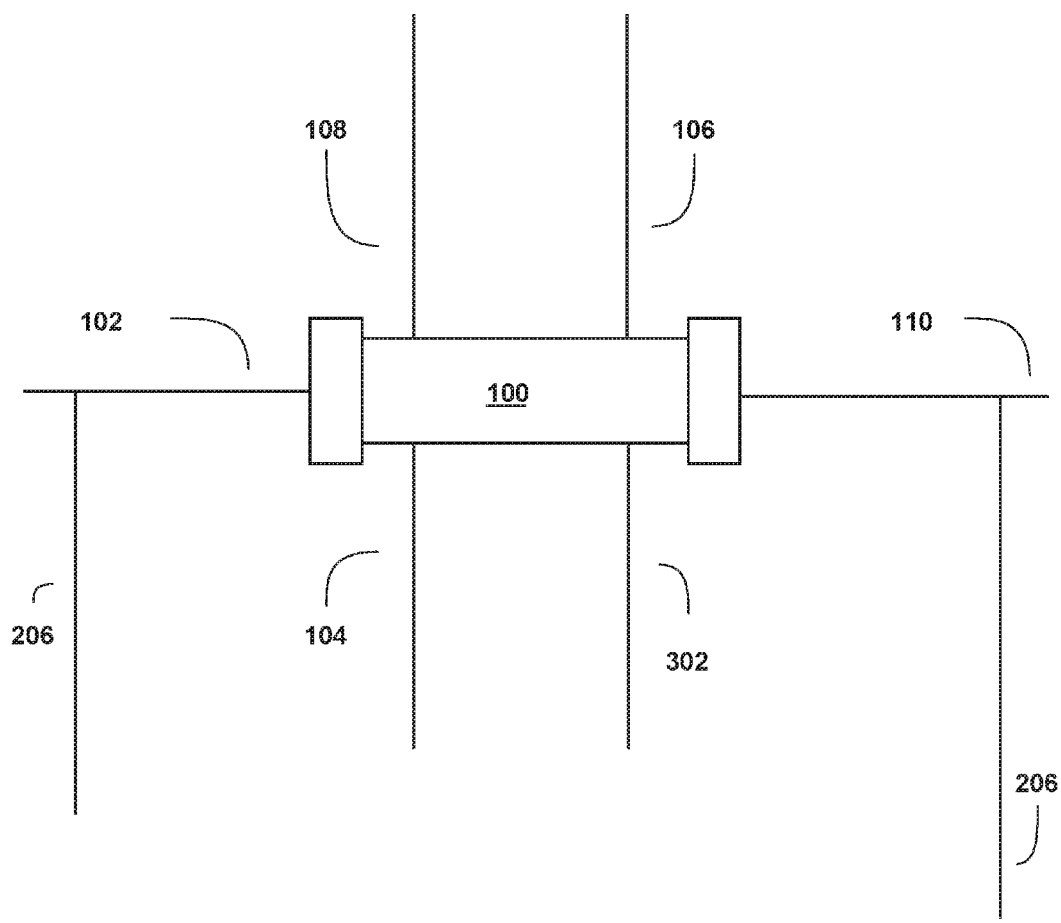
FIG. 1 illustrates a fluid energy transfer unit or module according to an aspect of an embodiment of the present invention.

Referring now to FIGS. 1 and 7, a fluid energy transfer unit or module 100 and a system 700 according to aspect(s) of embodiment(s) of the present invention, are shown. Fluid energy transfer unit or module 100 is shown as the unit through which a contaminated gas stream or flue gas 102 is fed. In one aspect of an embodiment of the present invention, fluid energy transfer module may be a heat exchanger, but it is not limited to just heat exchangers, and can be of any material or style suitable for the transfer of heat from gas stream or flue gas 102 to the solution resulting from the gas stream passing through fluid energy transfer module 100. In one aspect of an embodiment of the present invention, module(s) 100 may be a system of module(s) 100 multi-staged, with or without vacuum. In another aspect, module(s) 100 may be arranged in either series or parallel.

In operation, flue gas in stream 102 is transferred through fluid energy transfer unit or module 100 to evaporate water from the regenerated scrubber stream. In one aspect of an embodiment of the present invention flue gas 102 may contain water vapor 104 which is condensed and removed from module(s) 100. In another aspect of an embodiment of the present invention, flue gas 102 may enter module 100 at a temperature of 1400° C. and leave at a temperature of 150° C. It should be noted that the entry and exit temperatures of flue gas 102 can vary depending on the $CO_2$ source. It should also be noted that the entry and exit temperatures of flue gas 102 are not limited to any particular values.

The heat from flue gas 102 in module 100 may then be used to do a number of things. One is to evaporate off the extra water 108 from solution 302 received from slurry reaction vessel 300 (as discussed in more detail below). In one aspect of an embodiment of the present invention, solution 302 may include dilute Sodium Hydroxide (NaOH). The heat from flue gas 102 may then be used to evaporate, in one aspect, 1 mole of water per each mole of NaOH from solution 302. The resultant concentrated solution 106 is then fed to scrubber(s) 200 where it comes in contact with the cooled flue gas 110 (e.g. 200° C. flue gas) which has been cooled by passing flue gas 102 through module(s) 100. Scrubber(s) 200 will then will scrub the pollutant gases (i.e. $CO_2$, $SO_2$, $NO_2$) from the cooled flue gas stream 110.

Figure 2:
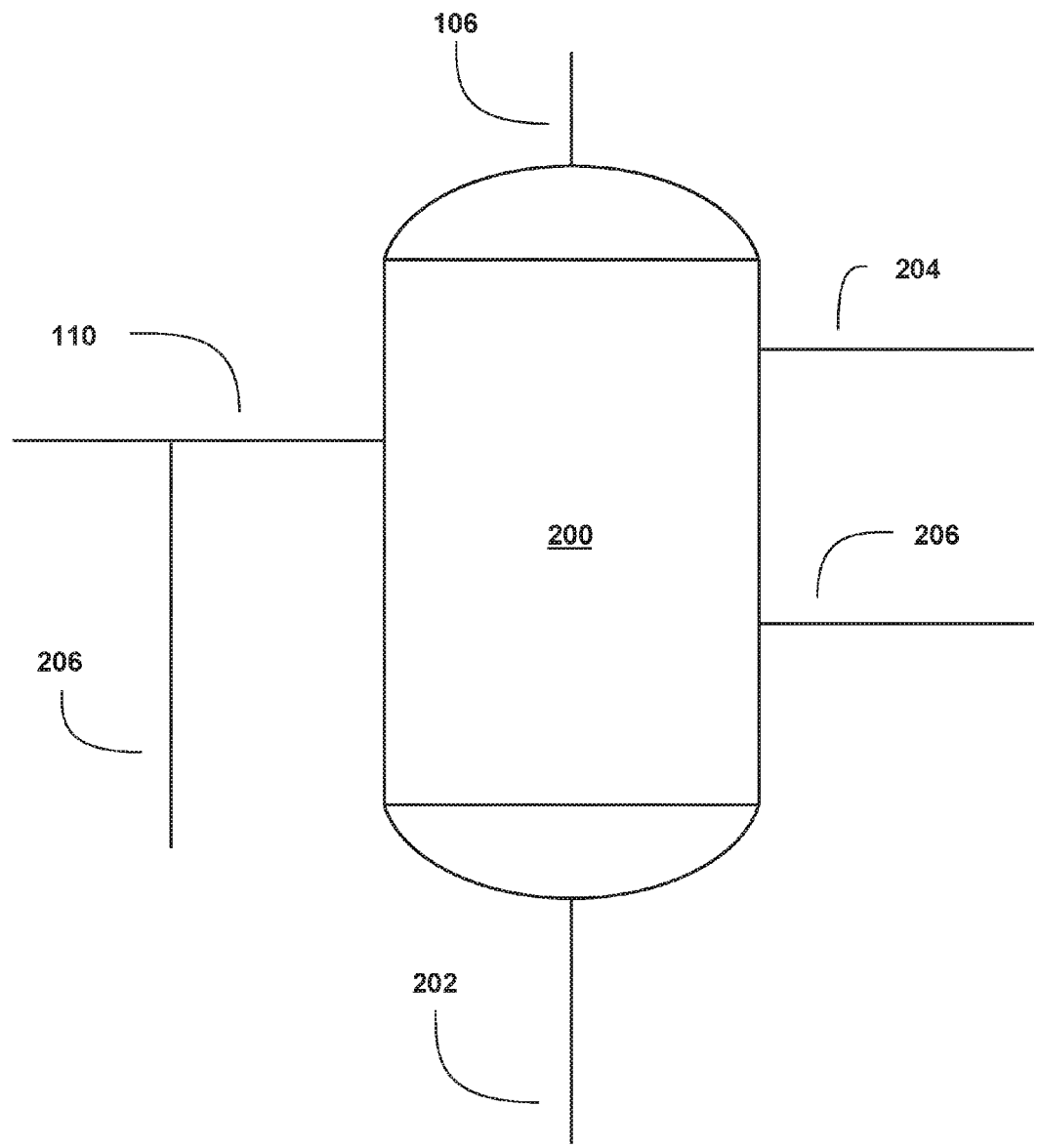
FIG. 2 illustrates a scrubber unit or module according to an aspect of an embodiment of the present invention.

Referring now to FIGS. 2 and 7, scrubber(s) 200 and a system 700 according to aspect(s) of embodiment(s) of the present invention, are shown. Dried or cooled gas stream 110 from module(s) 100 is transferred to scrubber(s) 200. In one aspect of an embodiment of the present invention, scrubber(s) 200 may be any device(s) that are capable of absorbing required amounts of $CO_2$, $NO_x$ and $SO_4$. In one aspect of an embodiment of the present invention, solution stream 302 from slurry reaction vessel 300 may also be fed, as concentrated solution 106, to scrubber(s) 200 after passing solution stream 302 through module(s) 100 (which concentrates the solution, by, in one aspect of an embodiment of the present invention, removal of one mole of water per each mole of NaOH as discussed above). In one aspect of an embodiment of the present invention, concentrated scrubber stream or liquid 302 may be a hydroxide solution which may be used to absorb nitrogen oxides, carbon oxides, and sulfur oxides to generate nitrates, carbonates, and sulfates which then make up output solution 202 of scrubber(s)

200. Any scrubbed flue gas 204 is expelled from scrubber(s) 200 to the atmosphere while scrubber solution 202, which now comprises, but is not limited to: excess water, hydroxides, carbonates, nitrates, and sulfates is pumped to slurry reaction vessel 300 where an ion exchange reaction occurs.

It should be noted that scrubber(s) 200 may use any hydroxide. Some conditions may use group 1 metal hydroxides to keep the scrubbed gases in solution. Group 2 metal hydroxides may be used downstream in the process to regenerate the KOH and/or NaOH via ion exchange and also facilitate the removal of the carbonates and sulfates as solids for easier handling.

Figure 3:
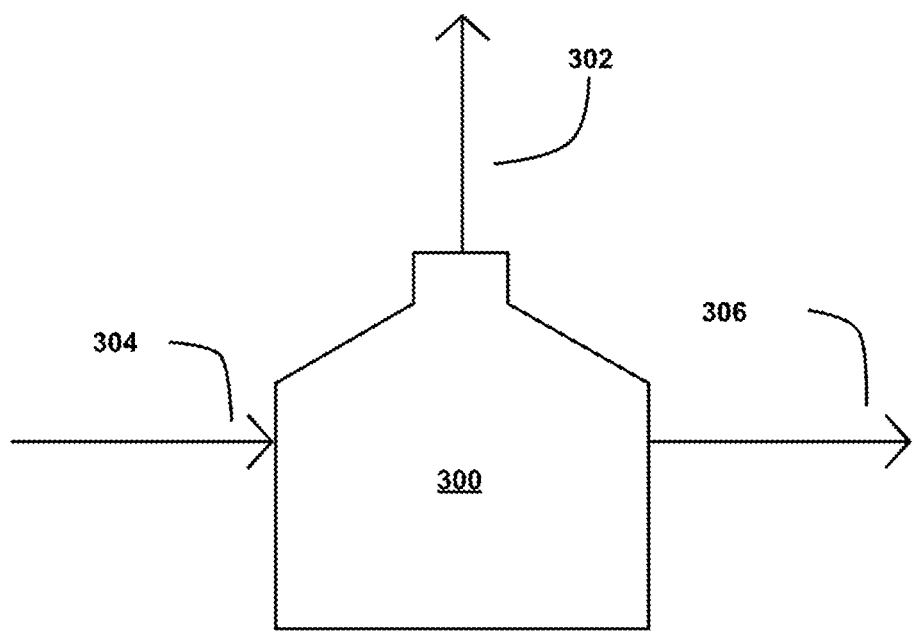
FIG. 3 illustrates a slurry reaction vessel according to an aspect of an embodiment of the present invention.

Referring now to FIGS. 3 and 7, slurry reaction vessel 300 and a system 700 according to aspect(s) embodiment(s) of the present invention, are shown. Here, output solution 202 from scrubber(s) 200 reacts with slurry creation chemical(s) 304 containing higher concentrations of nitrates, carbonates, and sulfates with chemicals to regenerate dilute scrubber solution 302 for reuse in scrubber(s) 200. Slurry reaction vessel 300 may also, in one aspect of an embodiment of the present invention, produce non-soluble solids for purification and may act as the venue for the ion exchange reaction. In one aspect of an embodiment of the present invention, such an ion exchange reaction may include, but not be limited to, Sodium Carbonate ($Na_2CO_3$) and Sodium Sulfate ($Na_2SO_4$) reacting with Calcium or Magnesium Hydroxide ($Ca(OH)_2$ or $Mg(OH)_2$) to generate Calcium or Magnesium Carbonate and Sulfate as illustrated below:

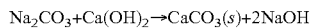

$Na_2CO_3 + Ca(OH)_2 \rightarrow CaCO_3(s) + 2NaOH$

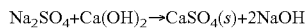

$Na_2SO_4 + Ca(OH)_2 \rightarrow CaSO_4(s) + 2NaOH$

These resultant products can then be held in solution or precipitated out as solids (where enough has been precipitated out from the solution) for disposal or packaging. In one aspect of an embodiment of the present invention, precipitation may take place in an agitated tank, or it could be done in a long pipe with nozzles to inject the $Ca(OH)_2$ or $Mg(OH)_2$ to the slurry at controlled concentrations along the length of the pipe. In one aspect of an embodiment of the present invention, the NaOH regenerated may be removed from slurry reaction vessel 300 and fed to module 100, where it may be further concentrated and then used in scrubber(s) 200. In one aspect of an embodiment of the present invention, the NaOH may stay in solution while the Ca and Mg compounds may precipitate out.

The slurry creation process in slurry reaction vessel 300 also generates desired compounds to be used downstream for disposal or packaging. Slurry 306, which is created, is then fed to surge tank treatment vessel 400. In another aspect of an embodiment of the present invention, the slurry 306 of slurry reaction vessel 300 may be treated to obtain any specific chemical analysis.

Figure 4:
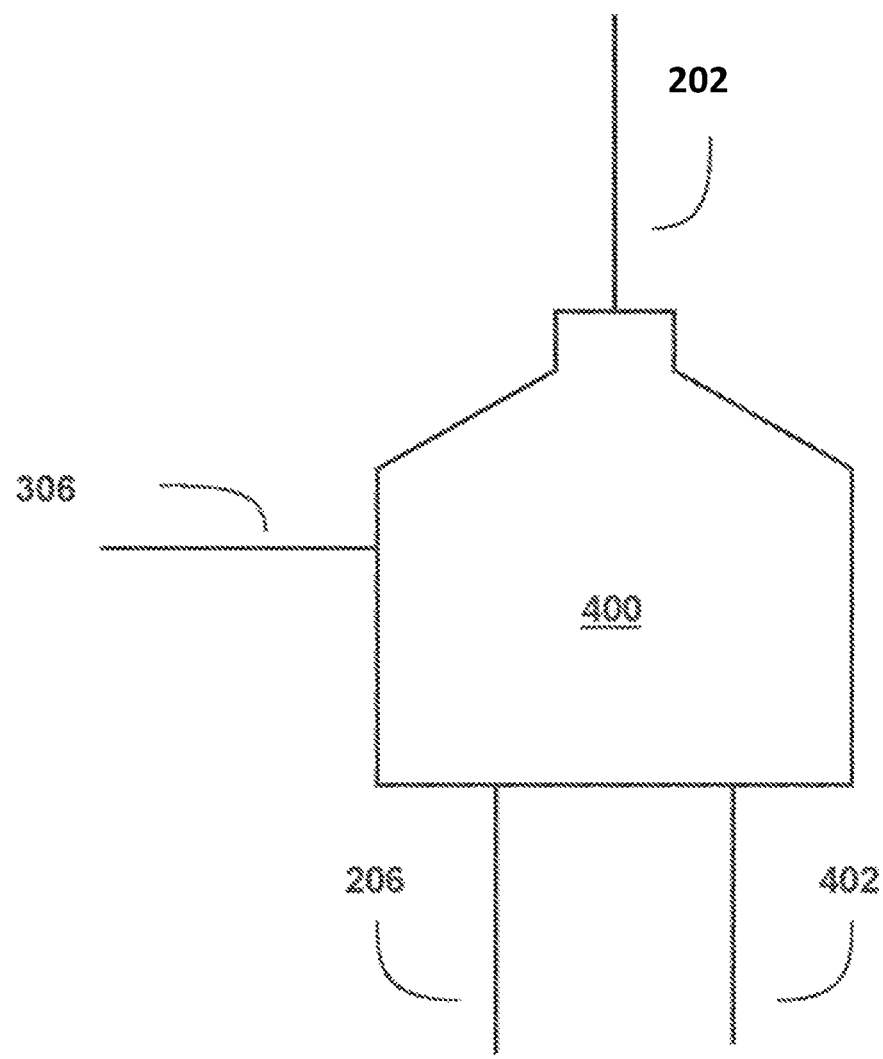
FIG. 4 illustrates a surge tank treatment vessel according to an aspect of an embodiment of the present invention.

Referring now to FIGS. 4 and 7, surge tank treatment vessel 400 and a system 700 according to aspect(s) of embodiment(s) of the present invention, are shown. In aspect(s) of embodiment(s) of the present invention, surge tank treatment vessel 400 may be one or more tanks. Surge tank treatment vessel 400 acts as a pretreatment vessel to generate desired products which are later transferred to purifier(s) 500. In one aspect of an embodiment of the present invention, slurry 306 of slurry reaction vessel 300 is transferred to surge tank treatment vessel 400 where, in one aspect, the pH of slurry 306 may be treated or adjusted to generate, in a controlled manner if desired, calcium and magnesium compounds. In one aspect of an embodiment of the present invention, the pH of slurry 306 may be adjusted with unscrubbed flue gas 206 ('acid gas'), or with any applicable acid or base. This treated solution 402 is then transferred to purifier(s) 500.

Figure 5:
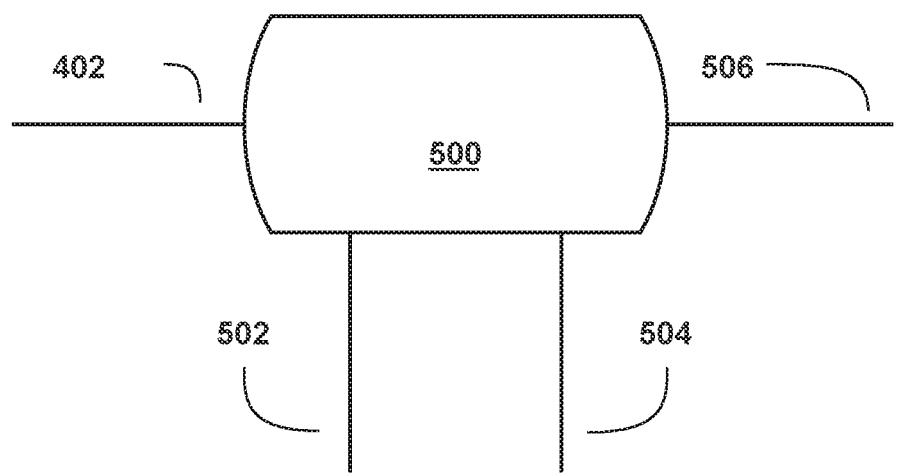
FIG. 5 illustrates a purifier unit or module according to an aspect of an embodiment of the present invention.

Referring now to FIGS. 5 and 7, purifier(s) 500 and a system 700 according to aspect(s) of embodiment(s) of the present invention, are shown. In one aspect of an embodiment of the present invention, purifier(s) 500 may be, without limitation, a crystallizing dryer and/or a filter press with the sole purpose of purifying and capturing powdered products for later subsequent use. Purifier(s) 500 may also be a purification system which allows for the separation of compounds from the treated solution 402. In one aspect of an embodiment of the present invention, this purification may include, but not be limited to, the precipitation and washing of carbonates 502 and sulfates 504 and the decanting of nitrates 506. Carbonates 502 can then be processed to create various oxide salts if desired and then purified. Purification may be done by maintaining specific concentrations at specific pHs and the rate of precipitation from the liquid will be different for each compound (i.e. $CaSO_4$, $CaCO_3$ etc) depending on the desired application. For instance, if the process needed to precipitate out $CaCO_3$ for use in paper whitening, a precipitated calcium carbonate system would be installed in purifier(s) 500 to make sure the size of the particles is correct or to the required specifications. However, if the process were to just handle $CaCO_3$ as waste it could be precipitated out as a bulk solid in an agitated tank then filtered and dried and then dumped in a land fill. The same could be said for the sulfates, and nitrates. In some aspects, nitrates 506 may not precipitate at all as may stay in solution at reasonable concentrations, hence the bleeding off of solution periodically to replace with fresh water/solution.

In another aspect of an embodiment of the present invention, the purification may be done by, but not limited to, a precipitated carbonate and sulfate system to select for specific size distribution and purity of the resultant product from purifier(s) 500. Nitrates 506, having been purified by purifier(s) 500 are transferred to concentrator 600 in order to be processed to reach a target concentration and density of solution for packaging or disposal.

Figure 6:
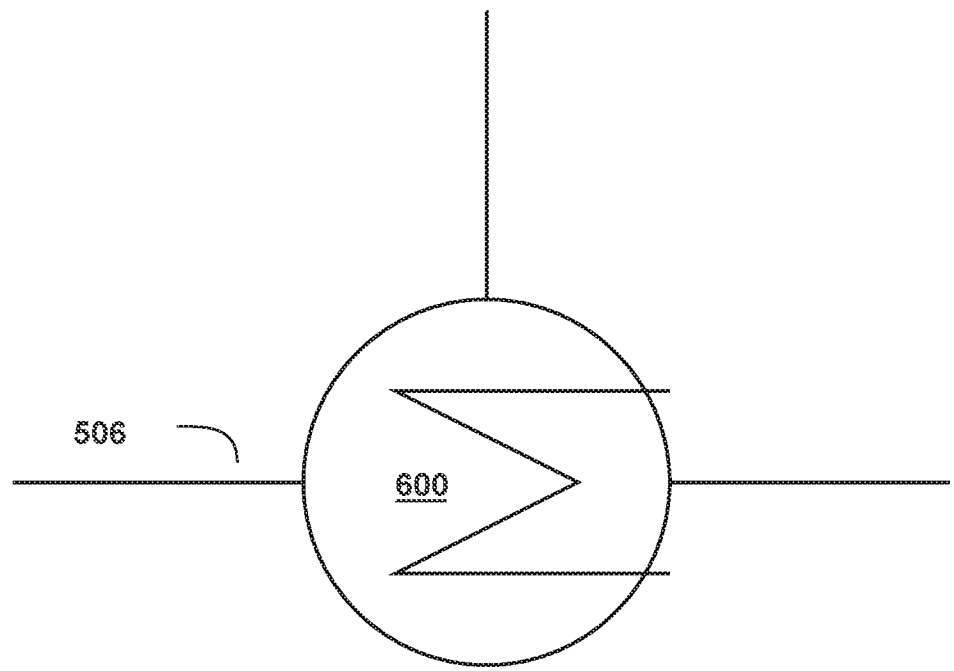
FIG. 6 illustrates a evaporator unit or module according to an aspect of an embodiment of the present invention.

Referring now to FIG. 6, concentrator 600 is shown according to an aspect of an embodiment of the present invention. In one aspect of an embodiment of the present invention, concentrator 600 may be another heat exchanger used to concentrate the compounds left in solution to a required specification to aid in packaging or disposal. Liquid nitrates 506 decanted from purifier(s) 500 may, in one aspect of an embodiment of the present invention, be transferred to concentrator 600 in order to concentrate the decant. This stream may be evaporated to specific densities and concentrations required by the user.

Aspect(s) of embodiment(s) of the present invention also contemplate the injection of fully scrubbed or partially scrubbed or unscrubbed effluent gas to surge tank treatment vessel 400 to help with treatment undertaken there. Other aspect(s) of embodiment(s) of the present invention also contemplate the use of fully scrubbed or partially scrubbed or unscrubbed effluent gas to aid in the dilution of the gas entering module 100. Additional aspect(s) of embodiment(s) of the present invention also contemplate the use of fully scrubbed or partially scrubbed or unscrubbed effluent gas to or from scrubber(s) 200 to aid in different operations of system 700.

It should be noted that components, modules or parts of system 700 may be connected via a system of piping, tubing, ductwork, channels etc, or any other structure(s)/system(s)

used to transport fluids and/or solids. It should also be noted that many other variations of aspect(s) of embodiment(s) of the present invention are possible. For instance, one aspect of an embodiment of system 700 may not need fluid energy transfer module(s) 100. In other aspect(s) of embodiment(s) of the present invention, there may be a plurality of module(s) 100 in series or in parallel, under pressure or vacuum. Likewise, in other aspect(s) of embodiment(s) of the present invention, the scrubber(s) 200 may represent a plurality of scrubbers or one scrubber and may be made of any material deemed required for reliability such as, but not limited to, stainless steel or titanium.

In another aspect of an embodiment of the present invention, scrubber solution 302 need not be regenerated as discussed above. The solids can still be generated by using the appropriate chemicals in the scrubber itself. For example, calcium hydroxide could be used exclusively or in tandem with other chemicals to generate a precipitate directly from the gas stream and the solids could then be purified or disposed of. In another aspect of an embodiment of the present invention the treatment step at surge tank treatment vessel 400 may not be required. The solids generated in the reaction step undertaken at slurry reaction vessel 300 may be purified and disposed of after scrubber solution 302 is regenerated.

In yet another aspect of an embodiment of the present invention the purification step undertaken at purifier(s) 500 may be optional as well and is unnecessary if the process does not need a purified discharge. Alternatively, the purification step can be undertaken by a plurality of systems which allow for the creation of the needed product.

In yet another aspect of an embodiment of the present invention the evaporation step undertaken at concentrator 600 may be optional as well and can either be eliminated and the decant disposed or it may fit a specification for another area and be piped directly to that area with no additional processing. In addition, the chemicals used in scrubber(s) 200 need not be hydroxides of any type as long as the oxides in the gas stream are removed and transported to a treatment step after the process with the intent of collecting said oxides for sale or disposal.

The invention has been described in detail with particular reference to certain preferred embodiments thereof, but it will be understood that variations and modifications can be effected within the spirit and scope of the invention.

What is claimed is:

1. A method for sequestering gas feed constituents and creating gas feed byproducts comprising the steps of:
   feeding a gas stream through at least one fluid energy transfer module;
   feeding a hydroxide to the at least one fluid energy transfer module;
   feeding the gas stream output from the at least one fluid energy transfer module through at least one scrubber unit;
   feeding a solution stream output from the at least one scrubber unit to a slurry reaction vessel wherein the solution stream output from the at least one scrubber unit is mixed with chemicals within the slurry reaction vessel to effect an ion exchange reaction;
   feeding slurry output from the slurry reaction vessel to a surge tank treatment vessel where the slurry output's pH is adjusted resulting in a treated solution;
   feeding the treated solution to at least one purifier; and
   feeding purified solution output from the at least one purifier to a concentrator;
   wherein the hydroxide is regenerated as a result of the ion exchange reaction.

2. The method of claim 1 further comprising the step of feeding concentrated solution from the concentrator to the at least one scrubber unit, wherein the concentrated solution is produced as a result of feeding the purified solution through the at least one fluid energy transfer module by evaporation.

3. The method of claim 1 wherein the ion exchange reaction occurs in the slurry reaction vessel.

4. The method of claim 1 further comprising the step of directly feeding partially or fully unscrubbed gas stream to any one of: the at least one scrubber or the surge tank treatment vessel.

5. The method of claim 1 further comprising directly feeding some of the output of the at least one fluid energy transfer module to the surge tank treatment vessel.

6. The method of claim 1 further comprising the step of precipitating solids from the at least one purifier.

7. The method of claim 1 wherein the concentrator output is a concentrated solution effected by evaporating water from the purified solution.

8. The method of claim 1 further comprising the step of removing water from the at least one fluid energy transfer module.

9. The method of claim 1 further comprising the step of removing scrubbed flue gas from the at least one scrubber unit.

10. The method of claim 1, wherein the gas stream comprises carbon dioxide.

11. The method of claim 1, wherein the gas feed byproducts comprises carbonate.

12. The method of claim 1, wherein the hydroxide is one or more of a Group I metal hydroxide and a Group II metal hydroxide.

* * * * *